No. 771,997. PATENTED OCT. 11, 1904.
A. PALM.
LATHE ATTACHMENT.
APPLICATION FILED NOV. 21, 1903.
NO MODEL.

Witnesses

Inventor
Alfred Palm
By H. B. Wilson
Attorney

No. 771,997. Patented October 11, 1904.

UNITED STATES PATENT OFFICE.

ALFRED PALM, OF VENTURA, CALIFORNIA.

LATHE ATTACHMENT.

SPECIFICATION forming part of Letters Patent No. 771,997, dated October 11, 1904.

Application filed November 21, 1903. Serial No. 182,122. (No model.)

*To all whom it may concern:*

Be it known that I, ALFRED PALM, a citizen of the United States, residing at Ventura, in the county of Ventura and State of California, have invented certain new and useful Improvements in Lathe Attachments; and I do declare the following to be a full, clear, and exact description of the invention, such as will enable others skilled in the art to which it appertains to make and use the same.

My invention is an improved lathe attachment for turning long shafts, stems, pipes, and other work, either inside or outside regardless of the length of the work, and which enables work to be done on lathes of ordinary length that heretofore could not be done excepting on long lathes.

My invention consists in the construction and combination of devices hereinafter described and claimed.

Figure 1:
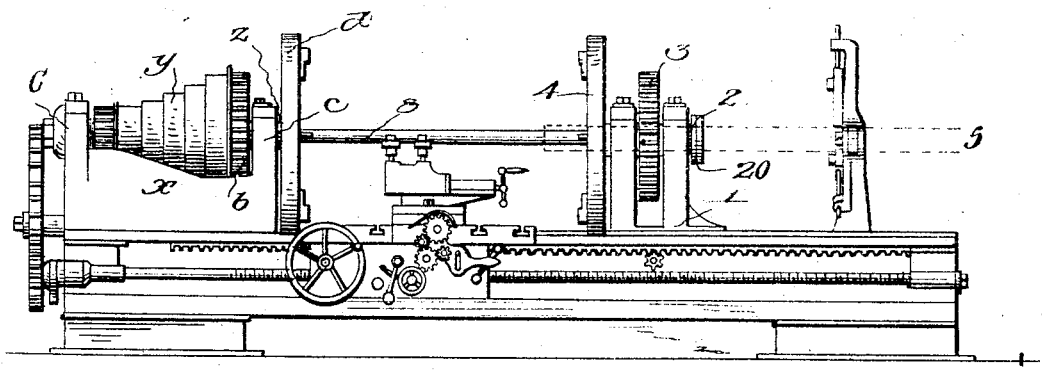
Figure 2:
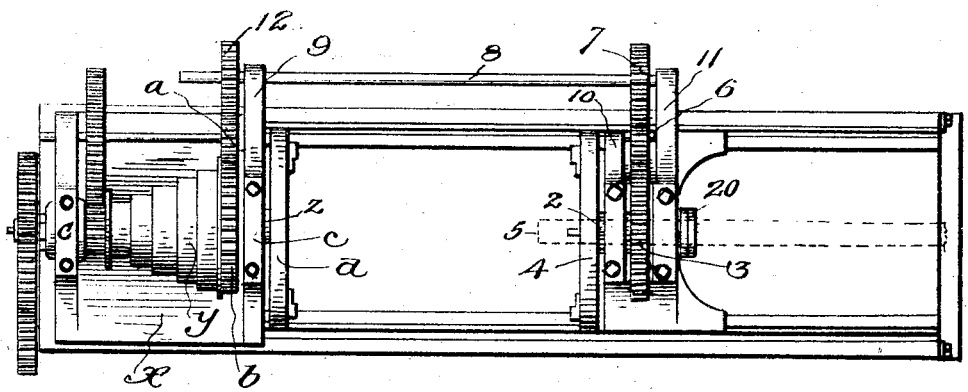

In the accompanying drawings, Figure 1 is a side elevation of a lathe provided with an attachment embodying my improvements. Fig. 2 is a top plan view of the same.

The lathe here shown is of usual form. It may be of any preferred form, as the same constitutes no part of my present improvements.

In frame 1, which is secured to the bed of the lathe, is journaled a tubular spindle 2, which is provided at its outer end with lock-nuts 20, as shown, and is provided at its front end with a chuck 4, the latter being screwed thereto. The work, which is indicated in dotted lines at 5, extends through the said tubular spindle and being engaged by the chuck 4 is rotated with said spindle. On the latter is keyed or otherwise secured a spur-gear 3.

The lathe-head $x$ has the cone-pulleys $y$, mounted on a spindle $z$, which revolves in the bearings $c$, and to the inner end of the said spindle is secured the usual chuck $d$. A spur-gear $b$ is keyed or otherwise secured to the spindle $z$ and revolves therewith. This spur-gear is engaged by a spur-gear $a$, the latter being thereby revolved. The shaft of the gear $a$ has one of its bearings in a support 9, the latter being secured to the head $x$. A gear 6, which is similar in size to the gear $a$, has its shaft journaled in a bearing 10 on the frame 1 and also journaled in a bearing in a support 11, attached to said frame. In the supports 9 11 is journaled a shaft 8, which is provided with gears 7 12, which respectively engage the gear 6 and the gear $a$, and hence power is communicated from the spindle $z$ to the shaft 8 and from the latter to the tubular spindle 2, which carries and revolves the work.

Having thus fully described my invention, what I claim as new, and desire to secure by Letters Patent, is—

In an attachment for short lathes to adapt the same for operating on long work, the combination with a lathe-frame, and a lathe-spindle, the latter carrying the lathe-head and a power-transmitting gear, of an attachment comprising a spindle-supporting frame secured to the lathe-frame and carrying a pair of bearing-brackets, one projecting laterally beyond the other, a tubular spindle mounted in said spindle-supporting frame, a gear fixed to said spindle, an idler journaled in said bearing-brackets and meshing with said gear, a bearing-bracket secured to the lathe-frame adjacent to the lathe-head, an idler carried thereby and meshing with the power-transmitting gear on the head-spindle, a shaft journaled in the latter-named bearing-bracket and the projecting portion of the longer of the pair of brackets first named, and gears upon said shaft meshing with the respective idlers, substantially as described.

In testimony whereof I have hereunto set my hand in presence of two subscribing witnesses.

ALFRED PALM.

Witnesses:
E. C. WATKINS,
E. M. BENNETT.